United States Patent
Callaway et al.

(10) Patent No.: US 7,339,976 B2
(45) Date of Patent: Mar. 4, 2008

(54) METHOD AND APPARATUS FOR REDUCING POWER CONSUMPTION WITHIN A WIRELESS RECEIVER

(75) Inventors: Edgar H. Callaway, Boca Raton, FL (US); Paul E. Gorday, West Palm Beach, FL (US); David B. Taubenheim, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 89 days.

(21) Appl. No.: 11/183,683

(22) Filed: Jul. 18, 2005

(65) Prior Publication Data

US 2007/0014335 A1    Jan. 18, 2007

(51) Int. Cl.
*H04B 1/00* (2006.01)
(52) U.S. Cl. ............. 375/136; 375/142; 375/150; 375/343
(58) Field of Classification Search ........ 375/344, 375/136, 142, 150, 343; 455/458
See application file for complete search history.

(56) References Cited

U.S. PATENT DOCUMENTS

| | | | | |
|---|---|---|---|---|
| 4,996,526 | A | * | 2/1991 | DeLuca ............ 340/7.35 |
| 5,757,864 | A | * | 5/1998 | Petranovich et al. ........ 375/344 |
| 6,282,181 | B1 | * | 8/2001 | Stark et al. ............. 370/335 |
| 6,421,371 | B1 | * | 7/2002 | Sourour et al. ........... 375/142 |
| 6,889,055 | B1 | * | 5/2005 | Neufeld ............... 455/458 |
| 2002/0106007 | A1 | * | 8/2002 | Lomp et al. ............ 375/147 |
| 2002/0186751 | A1 | * | 12/2002 | Kimura et al. .......... 375/142 |
| 2003/0149929 | A1 | * | 8/2003 | White ................ 714/766 |
| 2005/0243898 | A1 | * | 11/2005 | Reznik et al. .......... 375/147 |
| 2006/0018370 | A1 | * | 1/2006 | Mizuno ................ 375/150 |

* cited by examiner

*Primary Examiner*—Curtis B. Odom

(57) ABSTRACT

A method and apparatus for reducing power consumption within a wireless receiver is provided herein. Particularly, the use of partial chip sequence correlation to reduce the average power consumption of a direct sequence spread spectrum (DSSS) wireless transceiver is provided herein. During operation, the receiver will attempt to correlate, or de-spread, less than all chips that constitute a symbol. A partial correlation may be performed on M chips, where M may be much less than N, the number of chips that represent a whole symbol. In a preferred embodiment, the M chips are the first M chips in the symbol.

13 Claims, 2 Drawing Sheets

100

METHOD AND APPARATUS FOR REDUCING POWER CONSUMPTION WITHIN A WIRELESS RECEIVER

FIELD OF THE INVENTION

The present invention relates generally to wireless receivers and in particular, to a method and apparatus for reducing power consumption within a wireless receiver.

BACKGROUND OF THE INVENTION

Low power consumption, and thus long battery life, is critical to the success of next-generation ad-hoc wireless devices. Many ad-hoc devices transmit with such low power, that their receivers actually consume more power than do their transmitters. Further, the receivers of these devices are often active more than their transmitters, exacerbating the energy consumption problem. Due to the typical high frequency of operation (2.4 GHz) and the need to use radio frequency (RF) complementary metal oxide semiconductor (CMOS) integrated circuit (IC) processes to reduce cost and increase integration, the RF front end of the receiver typically consumes the most power. Reduction of this power is very desirable. Therefore, a need exists for a method and apparatus for reducing power consumption in a wireless receiver's RF front end.

DETAILED DESCRIPTION OF THE DRAWINGS

In order to address the above-mentioned need, a method and apparatus for reducing power consumption within a wireless receiver is provided herein. Particularly, the use of partial chip sequence correlation to reduce the average power consumption of a direct sequence spread spectrum (DSSS) wireless transceiver is provided herein. During operation, the receiver will attempt to correlate, or de-spread, less than all chips that constitute a symbol. A partial correlation may be performed on M chips, where M may be much less than N, the number of chips that represent a whole symbol. In a preferred embodiment of the present invention, the M chips are the first M chips in the symbol.

If an acceptable partial correlation is made, short time constant, high power consumption circuits, such as the receiver front end, may be set to a low-power state for the remainder of the symbol, and then returned to normal operating power prior to the beginning of the next symbol. The low-power state may be achieved by a reduction of supply current, voltage, or clock frequency; by switching the circuits off completely, or by a combination of these or other techniques. This can significantly reduce power consumption of the receiver.

The present invention encompasses a method for reducing power consumption within a wireless receiver. The method comprises the steps of receiving M chips from a chip stream, wherein symbols comprise N chips and M<N, associating the M chips from the chip stream with a symbol, and placing at least one component within the receiver in a low-power state for a predetermined period of time.

The present invention additionally encompasses a method for reducing power consumption within a wireless receiver. The method comprises the steps of receiving M chips from a chip stream, wherein symbols comprise N chips and M<N, determining a received signal characteristic, determining if the received signal characteristic satisfies a criterion, and associating the M chips from the chip stream with a symbol if the criterion is satisfied. At least one component within the receiver is placed in a low-power state if the criterion is satisfied until a beginning of a next symbol period.

The present invention encompasses an apparatus comprising a correlator receiving M chips from a chip stream, wherein symbols comprise N chips and M<N, the correlator determining correlation values of the M chips with possible symbols. The apparatus additionally encompasses decision circuitry associating the M chips from the chip stream with a symbol based on the correlation values, outputting the symbol, and placing at least one component within the receiver in a low-power state for a predetermined period of time.

Figure 1:
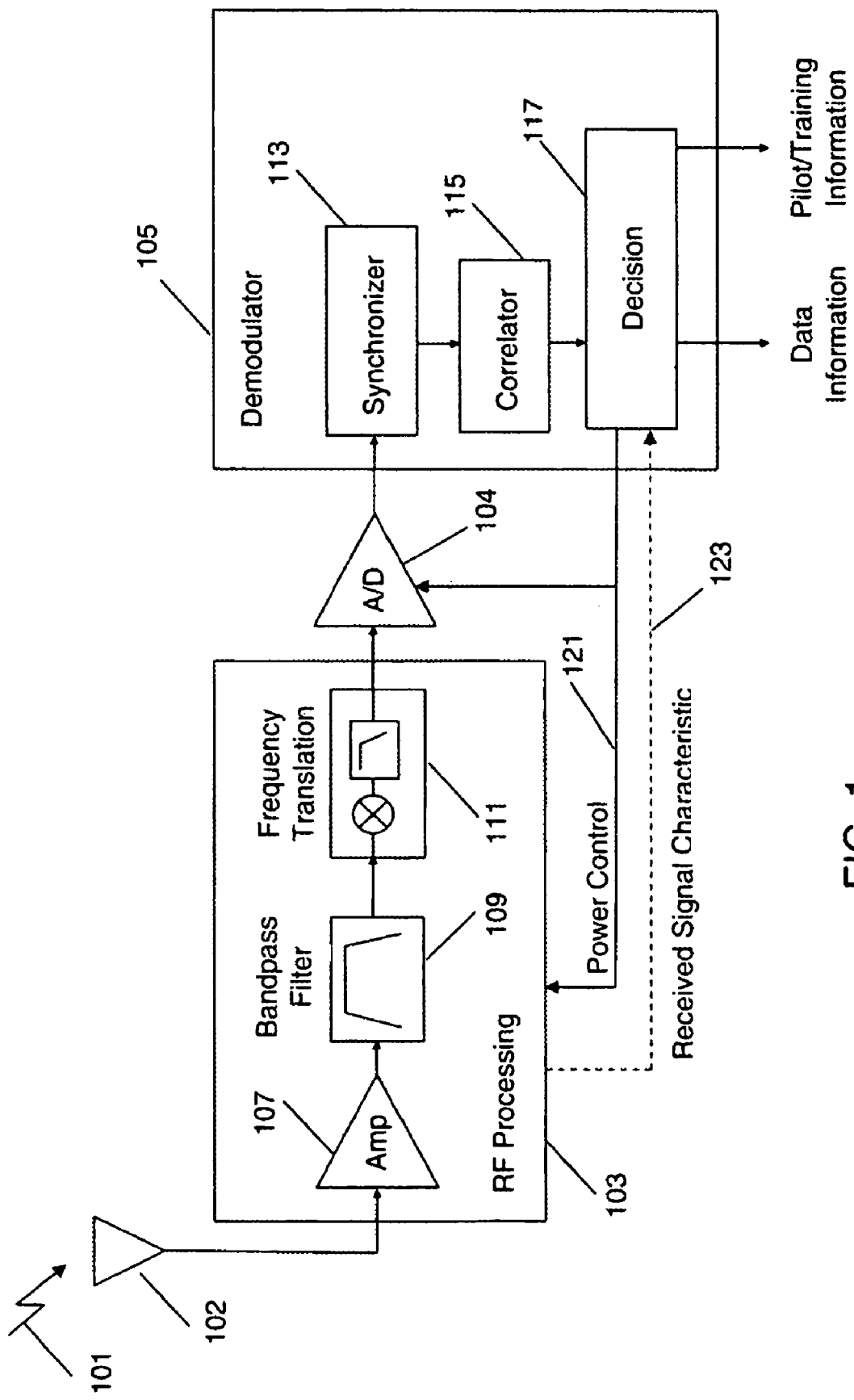
FIG. 1 is a block diagram of a radio receiver.

Turning now to the drawings, wherein like numerals designate like components, FIG. 1 is a block diagram of an exemplary radio receiver 100. As shown, receiver 100 comprises antenna 102, RF processing circuitry 103, analog-to-digital (A/D) converter 104, and demodulator 105. During operation signal 101 is received by antenna 102 and passed to RF processing circuitry 103, which may include amplifier 107, filter 109, and frequency-translation circuitry 111 to downconvert the RF signal to a baseband signal. A/D converter 104 receives the baseband signal and outputs an appropriately converted digital signal representing a chip stream. The digital signal output from A/D converter 104 may simply be an actual chip stream, or if multiple samples per chip are obtained, the digital signal may comprise a plurality of samples representing each chip. For example, if two samples were taken by A/D converter per chip period, then A/D converter 104 will output a digital stream where each chip is represented by two values.

As one of ordinary skill in the art will recognize, for direct sequence spread spectrum (DSSS) transmission/reception, each symbol is represented by a plurality of chip values. A symbol may convey one or more bits of information, in which case it is commonly referred to as a data symbol. The symbol may additionally provide a reference phase or amplitude used by a receiver to assist signal reception, in which case it is referred to as a pilot or training symbol. For example, a transceiver utilizing the 2.4 GHz IEEE 802.15.4 system protocol conveys 4 information bits per data symbol, with each of the 16 possible data symbols represented by a sequence of 32 chips. So, for example, the data symbol 0 will be represented by the chip stream 11011001110000110101001000101110. This is shown in Table 1.

TABLE 1

Relationship between data symbols and chip values

| Data symbol (Decimal) | Data symbol (Binary) ($b_0 b_1 b_2 b_3$) | Chip values ($c_0 c_1 ... c_{30} c_{31}$) |
|---|---|---|
| 0 | 0 0 0 0 | 1 1 0 1 1 0 0 1 1 1 0 0 0 0 1 1 0 1 0 1 0 0 1 0 0 0 1 0 1 1 1 0 |
| 1 | 1 0 0 0 | 1 1 1 0 1 1 0 1 1 0 0 1 1 1 0 0 0 0 1 1 0 1 0 1 0 0 1 0 0 0 1 0 |

TABLE 1-continued

Relationship between data symbols and chip values

| Data symbol (Decimal) | Data symbol (Binary) ($b_0 b_1 b_2 b_3$) | Chip values ($c_0 c_1 \ldots c_{30} c_{31}$) |
|---|---|---|
| 2 | 0 1 0 0 | 0 0 1 0 1 1 1 0 1 1 0 1 1 0 0 1 1 1 0 0 0 0 1 1 0 1 0 1 0 0 1 0 |
| 3 | 1 1 0 0 | 0 0 1 0 0 0 1 0 1 1 1 0 1 1 0 1 1 0 0 1 1 1 0 0 0 0 1 1 0 1 0 1 |
| 4 | 0 0 1 0 | 0 1 0 1 0 0 1 0 0 0 1 0 1 1 1 0 1 1 0 1 1 0 0 1 1 1 0 0 0 0 1 1 |
| 5 | 1 0 1 0 | 0 0 1 1 0 1 0 1 0 0 1 0 0 0 1 0 1 1 1 0 1 1 0 1 1 0 0 1 1 1 0 0 |
| 6 | 0 1 1 0 | 1 1 0 0 0 0 1 1 0 1 0 1 0 0 1 0 0 0 1 0 1 1 1 0 1 1 0 1 1 0 0 1 |
| 7 | 1 1 1 0 | 1 0 0 1 1 1 0 0 0 0 1 1 0 1 0 1 0 0 1 0 0 0 1 0 1 1 1 0 1 1 0 1 |
| 8 | 0 0 0 1 | 1 0 0 0 1 1 0 0 1 0 0 1 0 1 1 0 0 0 0 0 0 1 1 1 0 1 1 1 1 0 1 1 |
| 9 | 1 0 0 1 | 1 0 1 1 1 0 0 0 1 1 0 0 1 0 0 1 0 1 1 0 0 0 0 0 0 1 1 1 0 1 1 1 |
| 10 | 0 1 0 1 | 0 1 1 1 1 0 1 1 1 0 0 0 1 1 0 0 1 0 0 1 0 1 1 0 0 0 0 0 0 1 1 1 |
| 11 | 1 1 0 1 | 0 1 1 1 0 1 1 1 1 0 1 1 1 0 0 0 1 1 0 0 1 0 0 1 0 1 1 0 0 0 0 0 |
| 12 | 0 0 1 1 | 0 0 0 0 0 1 1 1 0 1 1 1 1 0 1 1 1 0 0 0 1 1 0 0 1 0 0 1 0 1 1 0 |
| 13 | 1 0 1 1 | 0 1 1 0 0 0 0 0 0 1 1 1 0 1 1 1 0 1 1 1 0 0 0 1 1 0 0 1 0 0 1 |
| 14 | 0 1 1 1 | 1 0 0 1 0 1 1 0 0 0 0 0 0 1 1 1 0 1 1 1 0 1 1 1 0 0 0 1 1 0 0 |
| 15 | 1 1 1 1 | 1 1 0 0 1 0 0 1 0 1 1 0 0 0 0 0 0 1 1 1 0 1 1 1 1 0 1 1 1 0 0 0 |

During operation of receiver 100, the chip stream output from A/D converter 104 enters demodulator 105 where symbol information is recovered from the chip values. Demodulator 105 typically includes a symbol synchronizer 113 that identifies which of the chip samples constitute a received symbol, as well as a correlator 115 that multiplies received chip samples by one or more stored PN sequences in order to recover symbol information. It is obvious to one of ordinary skill in the art that the correlator function described here is equivalent to a DSSS de-spreading operation, in which a PN sequence representing one of the transmitted symbols is multiplied by the received chip sequence and the result is integrated over the symbol period.

The demodulator also typically includes a decision element 117 that operates on correlation values and outputs symbol information. When the received symbol is a data symbol, the symbol information produced by the decision element may be a hard-decision estimate of the transmitted data symbol, or it may include soft-decision values, such correlation or other confidence values associated with one or more data symbols. When the received symbol is a pilot or training symbol, the symbol information produced by the decision element may include signal parameters such as amplitude and phase used to characterize the communication link.

As discussed above, the radio-frequency front end of the receiver typically consumes the most power. Reduction of this power is very desirable. In order to accomplish this task, demodulator 105 may perform a partial correlation on the first M chips of a symbol, where M may be much less than N, the total number of chips representing a symbol. If an acceptable partial correlation is made, short time constant, high power consumption circuits, such as receiver front end 103, may be set to a low-power state for the remainder of the symbol, and then returned to normal operating power prior to the beginning of the next symbol. This can significantly reduce power consumption of the receiver.

As an example, each data symbol used in the IEEE 802.15.4 2.4 GHz physical layer contains N=32 chips. Correlation may be performed on the first M=8 chips. If, for example, the first 8 chips received were the sequence 11011001, the receiver can determine that symbol 0 was sent. The receiver may then disable its front end for the remaining 24 chips.

Since receiver 100 relies on fewer chips to determine the sent data, the above-described technique is less sensitive than conventional DSSS detection. The effects of noise must be considered to ensure that poor signal conditions do not result in corrupted symbol information being output from demodulator 105. One technique that can be used to ensure the validity of symbols being output from demodulator 105 is to track a received signal characteristic to determine that a signal with an adequate quality is being received and to tailor operation of demodulator 105 to the received signal quality. Examples of received signal characteristics include received signal strength indication (RSSI), signal-to-noise ratio (SNR), and frequency error between transmitter and receiver. Such characteristics are typically measured using RF processing circuitry 103, demodulator 105, or a combination of both. If the signal includes forward error correction (FEC) coding or error detection coding, such as cyclic redundancy check (CRC) coding, bit error detection metrics can also be used as an indicator of received signal quality. When a high quality signal is present, the number of chips M used in the partial correlation may be decreased. Conversely, when a low quality signal is present, M may be increased. Thus, when using signal characteristics to determine a number of chips (M) to use, a receive signal characteristic 123 will be provided to decision circuitry 117. Decision circuitry 117 will instruct correlator 115 to pass correlation values of the first M chips, with M being based on signal characteristic 123.

While the above technique is useful, signal characteristics are often difficult to measure quickly and accurately. Because of this, in a second embodiment of the present invention, correlation circuitry 115 is utilized to produce partial correlation values. The partial correlation values themselves may be utilized to provide a more immediate indication of signal quality. When using partial correlation values, preferably the partial correlation values are computed as $$Z = \sum_{k=0}^{M-1} x_k c_k^*$$

where Z is the partial correlation value, $x_k$ (k=0, 1, . . . , M−1) are the first M chip samples of the received data symbol, preferably obtained near the center of each chip, $c_k$ (k=0, 1, ..., M−1) are the first M chip values associated with the one of the valid data or pilot/training symbols, and * is the complex conjugate operator. One of ordinary skill in the art will recognize this equation as the mathematical correlation between signals $x_k$ and $c_k$, and further that these values may be of multi-bit or single-bit precision. In another embodiment of the present invention the partial correlation values are simply a number of matching chips. So, in the IEEE 802.15.4 example described above, if the first 8 chip values were detected as 11111001, then the partial correlation value will be 7 for data symbol 0, since 7 of 8 possible chip values were correct. Similarly, the partial correlation value will be 6 for data symbol 1, 2 for data symbol 2, ..., etc.

Demodulator 105, and particularly decision circuitry 117, will evaluate the 8-chip correlation values to determine if a desired criterion is met. If multiple correlation values are available during each symbol, such as in the modulation scheme depicted in Table 1, then an example of the desired criterion is that the largest partial correlation value must exceed a threshold. If only a single partial correlation result is available, such as phase shift key (PSK) modulation where a single chip sequence is phase-modulated by the symbol information, then an example of the desired criterion is that the partial correlation magnitude exceeds a threshold. Many other such criteria for establishing the goodness of the partial correlation results are possible without restricting the spirit of this invention.

When the desired criterion is not satisfied, decision circuitry 117 instructs correlator 115 to continue accumulating chips, until it has received a total of 16 chips. Decision circuitry 117 then attempts a second partial correlation, this time on the first 16 chips of each possible sequence; again, the partial correlation results are only accepted by circuitry 117 if the partial correlation values meet a desired criterion. If the desired criterion is not met, correlator 115 continues to receive chips, until it has received a total of 32 chips (the complete symbol). At this point decision circuitry 117 outputs the symbol information. Although partial correlations of 8 chips and 16 chips are used in the above example, the invention may be implemented more generally with different partial correlation lengths as well as fewer or more stages of partial correlation evaluation.

As discussed above, if a desired criterion is satisfied after a partial correlation, selected components in the receiver front end and other short time constant, high power consumption circuits may be switched off (i.e., placed in a low-power state) for the remainder of the symbol, and then switched back on. Thus, in the preferred embodiment of the present invention when decision circuitry 117 determines that an acceptable partial correlation has been made, decision circuitry 117 outputs the corresponding symbol information and additionally instructs circuitry to enter a low-power state via a power control signal 121. If there are additional symbols to be demodulated, the circuitry will be instructed to return to normal operation power in time to receive the first chip of the next symbol. In the IEEE 802.15.4 example, if demodulator 105 detects 11011001 for the first eight chips, it will stop accumulating chips and output symbol 0. Also, circuitry such as RF amplifiers 107, frequency translation circuitry 111, and A/D converters 104 will be instructed to enter a reduced power state. Then demodulator 105 will wait for approximately N−M (24) chip times, minus any circuit warm-up times, and then will instruct the circuitry to return to normal operating power.

Figure 2:
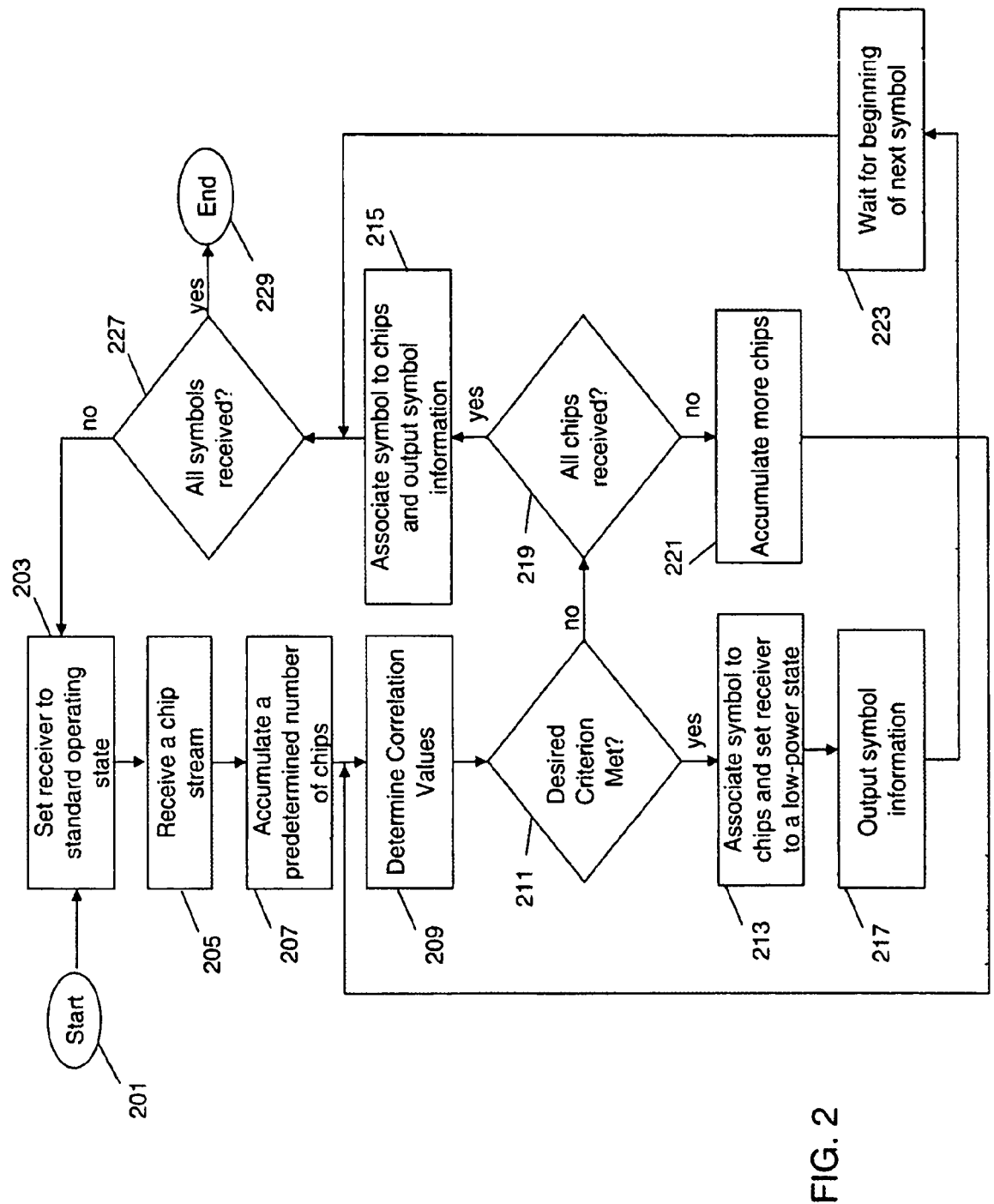
FIG. 2 is a flow chart showing the operation of the radio receiver of FIG. 1.

FIG. 2 is a flow chart showing operation of demodulator 105. The logic flow described in FIG. 2 can be performed when either partial correlation is being used to determine a number of chips (M) to accumulate, or may be used to determine the number of chips to accumulate when signal strength is being utilized to determine M. Regardless of the technique utilized, the logic flow begins at step 201. At step 203, receiver 100 is placed in a standard (i.e., not a low power) operating state. At step 205 a digital stream is received by synchronizer 113 that represents a chip stream. As discussed above, the stream may comprise a number of samples per chip, or may simply comprise the actual chip stream. At step 207 correlator 115 receives a predetermined number (M) of chips, where M<N and determines partial correlation values of the M chips with all possible symbols. (step 209). (As discussed, symbols comprise M chips, with the partial correlation value being performed on less than N chips). The accumulated chips and the partial correlation values are passed to decision circuitry 117 where it is determined if a desired criterion has been met (step 211).

As discussed above, the desired criterion may comprise an indication if a partial correlation value passes a predetermined quality threshold, or alternatively may comprise an indication if signal strength is above a criterion. At step 211, decision circuitry 117 then may determine if the value of the signal characteristic passes a criteria.

If at step 211 a desired criteria has been met, then decision circuitry 117 associates the received chips (e.g., M chips) from the chip stream with a symbol and causes receiver 100 to operate in a low-power state (step 213) and outputs symbol information based on the partially-received chip stream (step 217). As discussed above, at least one component within the receiver front end is placed in a low power state until a beginning of a next symbol period. Such components include amplifiers, filters, frequency translation circuitry, analog-to-digital conversion circuitry, ..., etc.

The logic flow then continues to step 223 where a low-power state remains until the beginning of the next symbol (e.g, a time period related to a time it takes to receive N−M chips). If all symbols have been received (step 227), the logic flow ends at step 229; however, if all symbols have not been received the logic flow returns to step 203 where the receiver is placed in a standard (i.e., not a low power) operating state.

Returning to step 211, if it is determined that the desired quality criterion has not been met, the logic flow continues to step 219 where decision circuitry 117 determines if all chips have been received. If all chips have not been received, the logic flow continues to step 221 where more chips are accumulated by correlator 115 and the logic flow returns to step 209. If, however, it is determined that all chips have been received, the logic flow continues to step 215 where symbol information is associated to the received chips and output by decision circuitry 117. The logic flow continues to step 227.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for reducing power consumption within a wireless receiver, the method comprising the steps of:
   receiving M chips of a symbol comprising N chips, wherein M<N;
   associating the M chips with the symbol;
   wherein the step of associating the M chips with the symbol comprises the steps of:
      determining a partial correlation value from the M chips;
      determining if the partial correlation value satisfies a criterion;

associating the M chips to the symbol if the criterion is satisfied; and placing at least one component within the receiver in a low-power state for a predetermined period of time if the partial correlation value satisfies the criterion.

2. The method of claim 1 wherein the step of placing at least one component in the low-power state comprises the step of placing the at least one component within the receiver in a low-power state for a time period related to a time it takes to receive N−M chips.

3. The method of claim 1 wherein the step of determining the partial correlation value comprises the step of determining $$Z = \sum_{k=0}^{M-1} x_k c_k^*$$

where $x_k$ (k=0, 1, . . . , M−1) are the first M chip samples of the received symbol, $c_k$ (k=0, 1, . . . , M−1) are the first M chip values associated with one of a valid symbol, and * is the complex conjugate operator.

4. The method of claim 1 wherein the step of associating the M chips with the symbol comprises the steps of:
determining a received signal characteristic;
determining if the received signal characteristic satisfies a criterion; and
associating the M chips to the symbol if the criterion is satisfied.

5. The method of claim 1 wherein the step of placing at least one component within the receiver in a low-power state comprises the step of placing a receiver front end in a low-power state.

6. The method of claim 5 wherein the step of placing a receiver front end in a low-power state comprises the step of placing an amplifier, a filter, frequency translation circuitry, or analog-to-digital conversion circuitry in a low-power state.

7. The method of claim 1 wherein the step of placing at least one component within the receiver in the low-power state for the predetermined period of time comprises the step of placing at least one component within the receiver in the low-power state until a beginning of a next symbol period.

8. An apparatus comprising:
a correlator receiving M chips of a symbol comprising N chips, wherein M<N and determining partial correlation values of the M chips with possible symbols; and
decision circuitry associating the M chips with a particular symbol based on the partial correlation values, outputting the symbol, and placing at least one component within the receiver in a low-power state for a predetermined period of time based on the partial correlation values;
wherein the decision circuitry associates the M chips with the symbol if a correlation value satisfies a criterion.

9. The apparatus of claim 8 wherein decision circuitry places the at least one component within the receiver in a low-power state for a time period related to a time it takes to receive N−M chips.

10. The apparatus of claim 8 wherein the correlation value comprises $$Z = \sum_{k=0}^{M-1} x_k c_k^*$$

where $x_k$ (k=0, 1, . . . , M−1) are the first M chip samples of the received symbol, $c_k$ (k=0, 1, . . . , M−1) are the first M chip values associated with of one of a valid symbol, and * is the complex conjugate operator.

11. The apparatus of claim 8 wherein the apparatus further comprises circuitry to determine a received signal characteristic, and wherein the decision circuitry associates the M chips with the symbol if the received signal characteristic satisfies a criterion.

12. The apparatus of claim 8 wherein the decision circuitry places a receiver front end in a low-power state.

13. The apparatus of claim 12 wherein the receiver front end comprises an amplifier, a filter, frequency translation circuitry, or analog-to-digital conversion circuitry.

* * * * *